INVENTORS
ROBERT H. HILL AND JAMES H. GUYTON
BY
THEIR ATTORNEYS

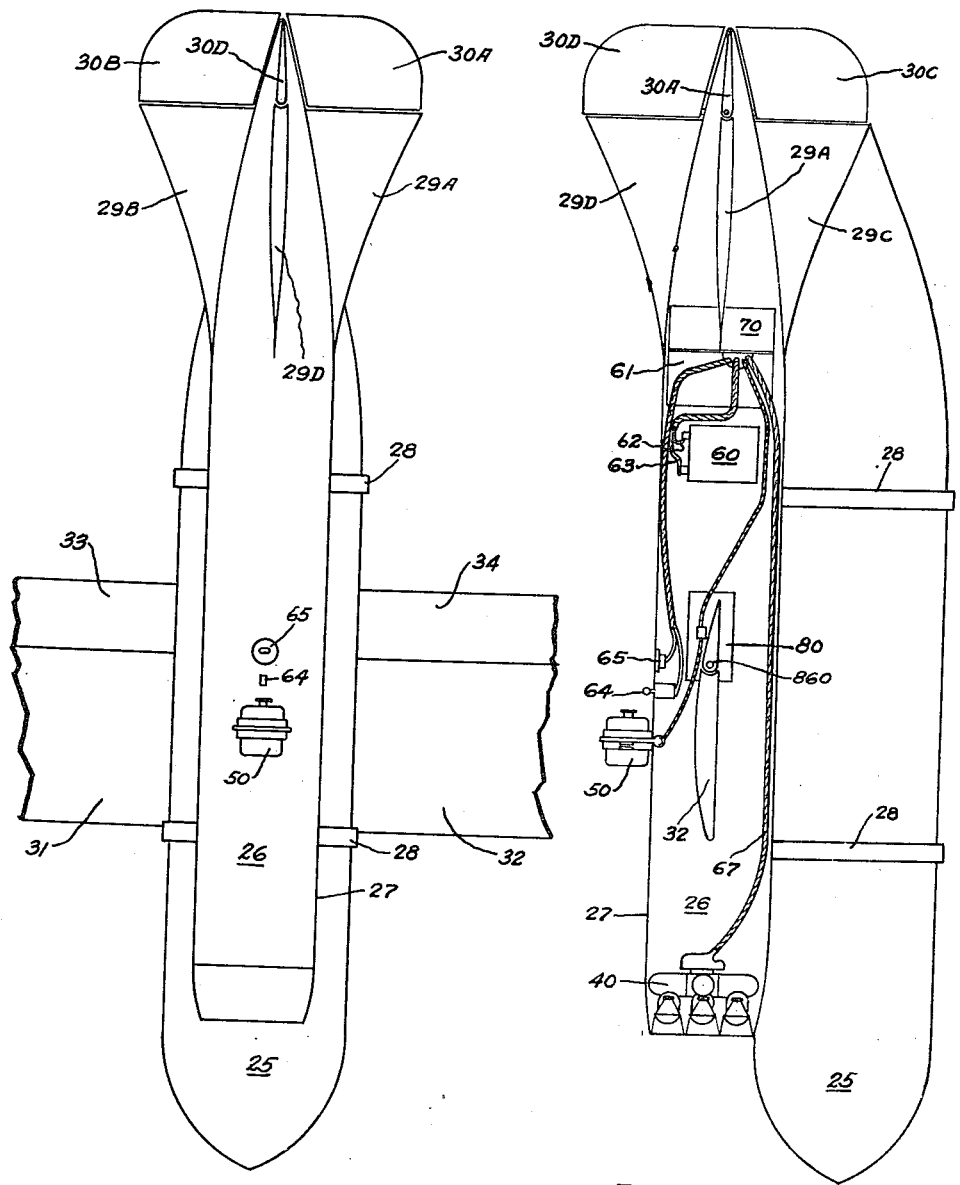

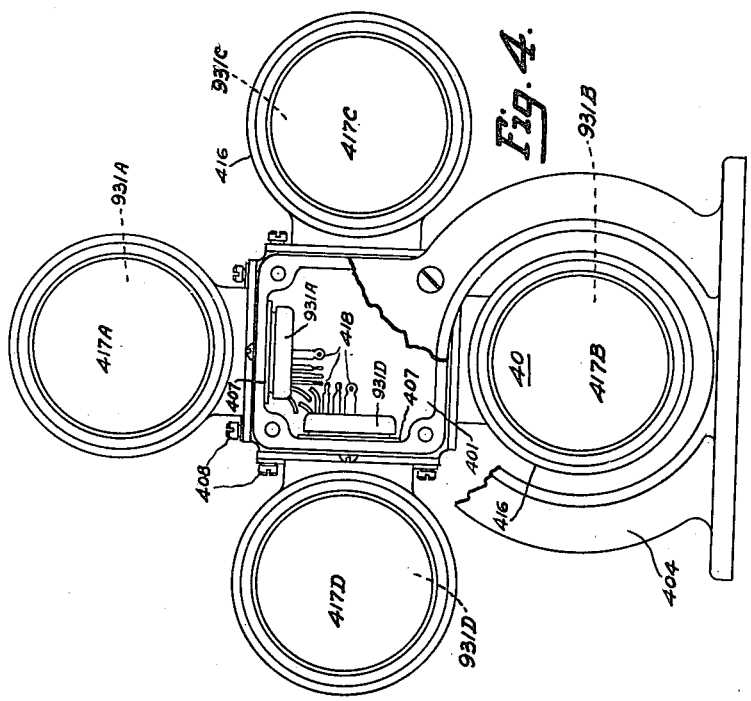
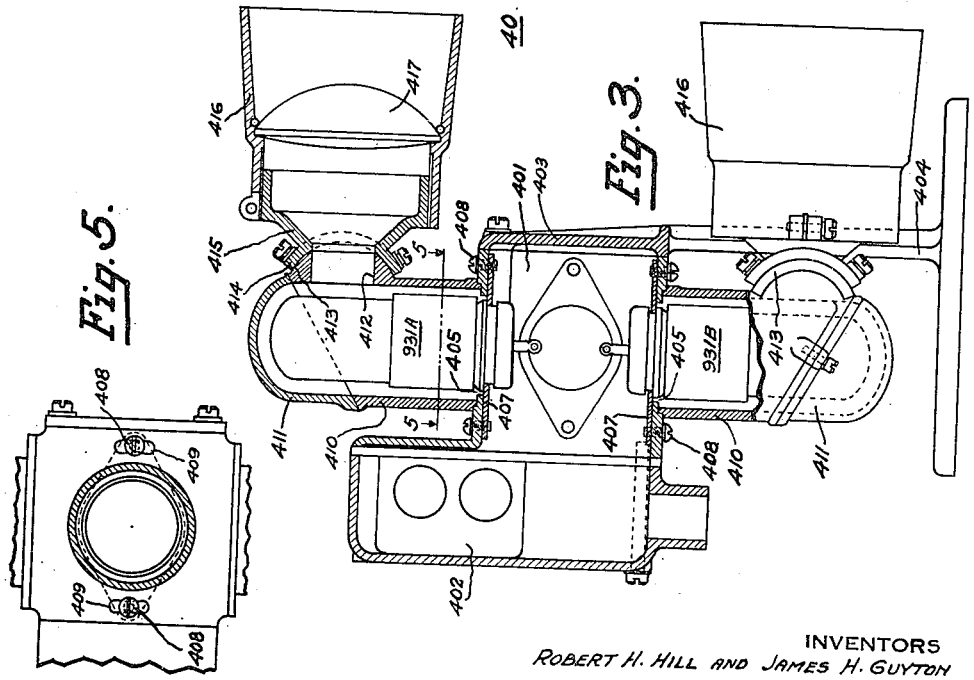

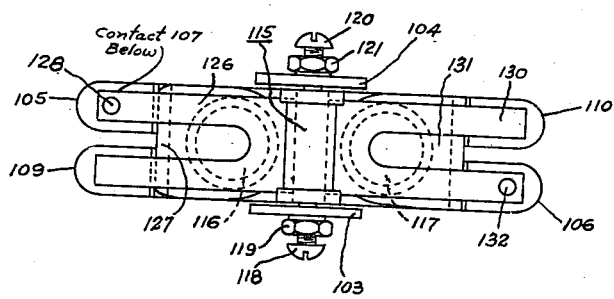
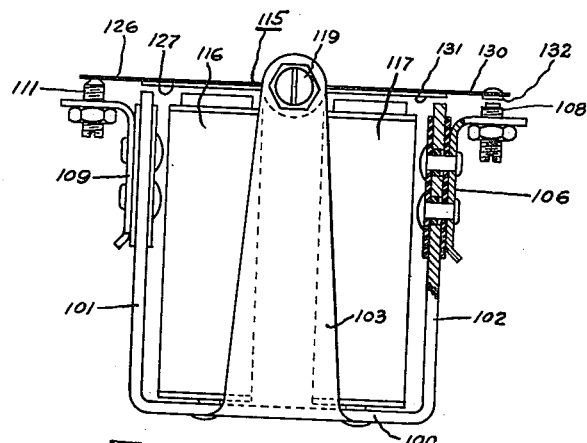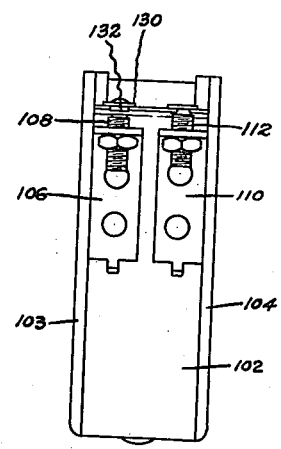
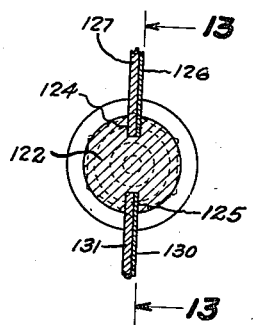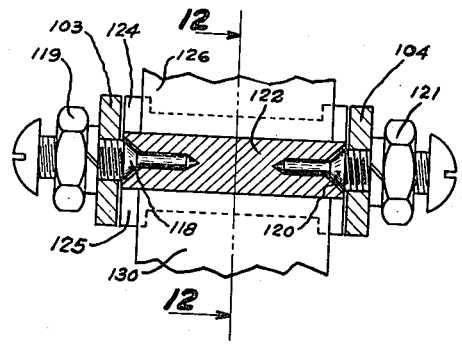

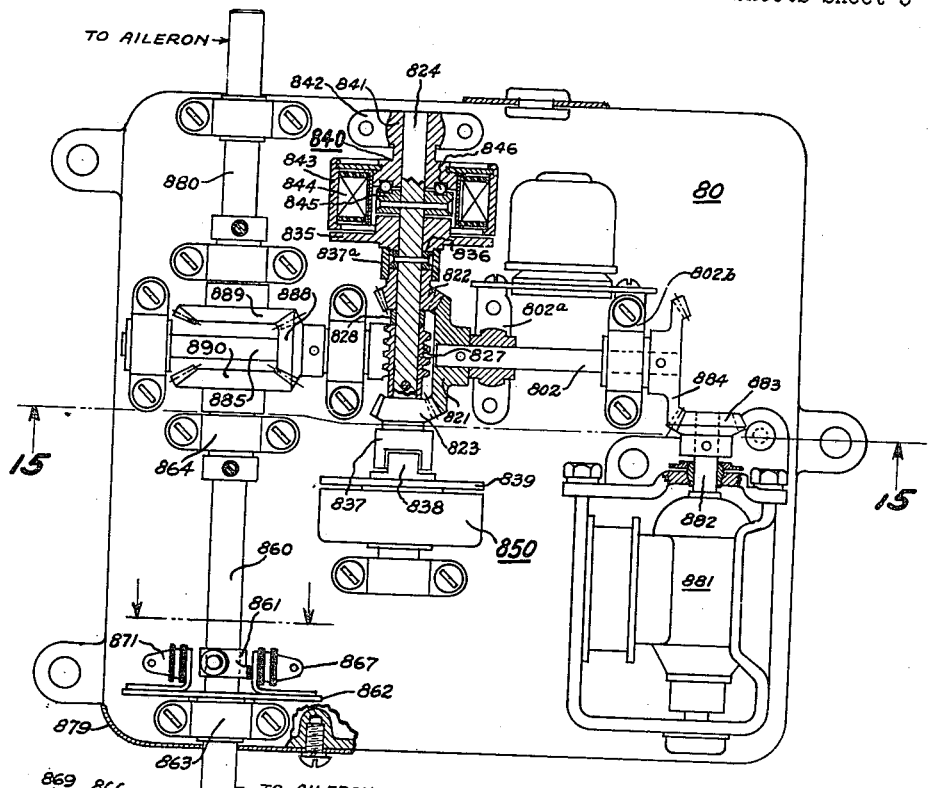
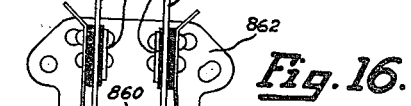
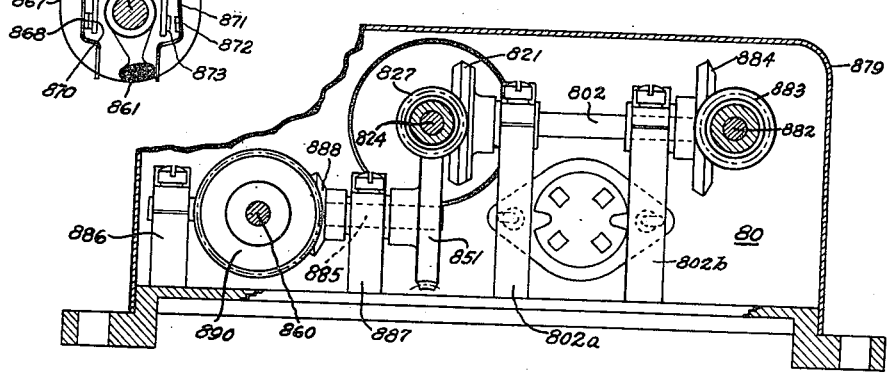

INVENTORS
ROBERT H. HILL AND
JAMES H. GUYTON
BY
THEIR ATTORNEYS.

INVENTORS
ROBERT H. HILL AND
JAMES H. GUYTON
BY
THEIR ATTORNEYS.

Patented Aug. 4, 1953

2,647,707

UNITED STATES PATENT OFFICE 2,647,707

CONTROL FOR AERIAL TORPEDOES

Robert H. Hill, Anderson, and James H. Guyton, Kokomo, Ind., assignors to General Motors Corporation, Detroit, Mich., a corporation of Delaware Application October 9, 1942, Serial No. 461,370

12 Claims. (Cl. 244—14)

This invention relates to control mechanism for a torpedo and particularly an aerial torpedo adapted to be released or launched from an airplane or airship during flight.

It is among the objects of the present invention to provide a torpedo with control mechanism capable of maintaining it in a substantially direct path toward a source of light in the direction of which the torpedo was launched.

This is accomplished by providing the torpedo with stabilizing means in the form of oppositely disposed wings having adjustable ailerons and steering means comprising fins each having a movable end portion forming an elevator or a rudder. Mechanisms for operating said ailerons and elevators and rudders in either direction are provided. The control mechanism also comprises optical apparatus including photoelectric cells adapted, in response to being affected by the light emanating from the target toward which the torpedo has been launched, to produce energy for actuating the mechanisms which operate the steering means to hold the torpedo on its proper course toward the target.

A further object of the present invention is to provide a control mechanism for a standard torpedo, so constructed and arranged that the entire mechanism may be attached to the torpedo quickly and with a minimum requirement of labor.

Further objects and advantages of the present invention will be apparent from the following description, reference being had to the accompanying drawings wherein a preferred embodiment of the invention is clearly shown.

In the drawings:

Fig. 1 is a plan view in outline, of a torpedo equipped with the present invention.

Fig. 2 is a side view in outline of the torpedo shown in Fig. 1.

Fig. 3 is a side view, partly in section, showing the assembly of the optical device of the control mechanism.

Fig. 4 is a front view of the device shown in Fig. 3.

Fig. 5 is a fragmentary sectional view taken along the line 5—5 of Fig. 3.

Fig. 9 is a plan view of the walking beam electric relay device of the control mechanism.

Fig. 10 is a side view of the relay device shown in Fig. 9.

Fig. 11 is an edge view of the relay.

Fig. 12 is a fragmentary, detail sectional view taken along the line 12—12 of Fig. 13.

Fig. 13 is a fragmentary, sectional view of the pivoted member of the relay and is taken along the line 13—13 of Fig. 12.

Fig. 14 is a plan view, with parts in section, illustrating the stabilizer operating apparatus of the control mechanism.

Fig. 15 is a side view of the apparatus shown in Fig. 14.

Fig. 16 is a detail view of the limit switch in the stabilizer operating mechanism of Figs. 14 and 15.

Figure 6:
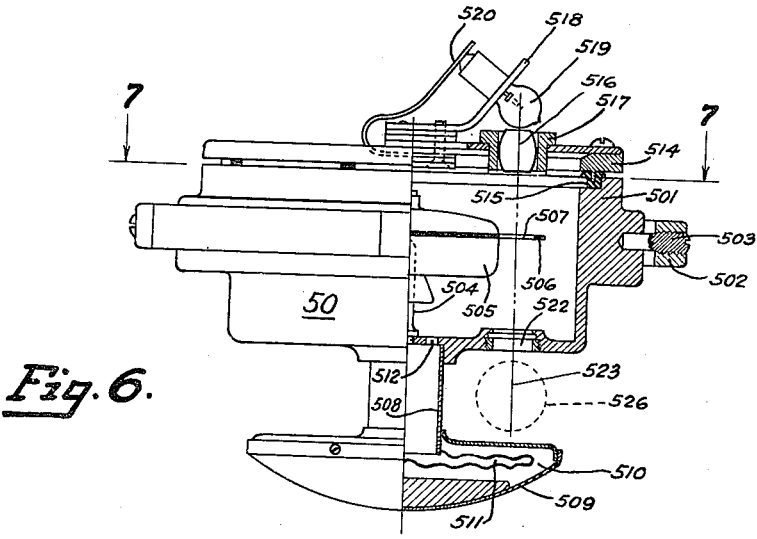
Fig. 6 is a side view, partly in section, of the compass device of the control mechanism.

A torpedo equipped with the present invention is particularly adapted for nocturnal use. It is launched from a flying airplane or airship being directed at a target from which light is emanating or which has previously been illuminated by any suitable means such as the placing of a flare on or near the target or igniting it by an incendiary bomb. At the time of launching, switches are automatically actuated to connect the source of electric power, a storage battery in the present instance, with the various elements of the control mechanism whereby the torpedo is properly guided and stabilized in its flight. The optical portion of the mechanism in the form of photoelectric cells, commonly known as "electric eyes" is directed at the source of light on or near the target which light when striking said "electric eyes" will cause them to be excited and become effective under certain circumstances to set the steering mechanism into operation for maintaining the flight of the torpedo directly toward the source of light at which the electric eyes are directed. Any swerving of the torpedo out of this direct path toward the light will cause one of said "electric eyes" to become effective and set the proper mechanism into operation to actuate the steering apparatus again to bring the torpedo into its proper course directed at the target.

Stabilizing apparatus adapted to preserve lateral balance and to limit rotation of the torpedo in one direction or the other to a small amount during flight is rendered effective by a compass.

Referring to the drawings, the Figs. 1 and 2 illustrate the torpedo which may be of any suitable standard aerial type not provided, however, with the usual guiding and stabilizing fins, in the present instance the control mechanism of the present invention provides the means for steering and stabilizing the torpedo after it is launched. The torpedo itself is designated by the numeral 25 while the control mechanism as a whole is referred to by the numeral 26.

The control mechanism 26 comprises a casing 27 which is of streamlined construction and is attachable to the torpedo in any suitable manner as for instance by means of bands 28. The front end of the casing 27 is blunt and open to receive the optical portion of the control mechanism. The rear end of the casing is pointed or streamlined and has a group of oppositely disposed fins 29A, 29B, 29C and 29D secured to the casing 27 so as to be at 90° one to another.

Elevators 30A and 30B, and rudders 30C and 30D are provided, each aligning with a respective fin, all of these steering elements being pivotally carried by the casing so as to be movable into and out of alignment in either direction with its respective fin. These fins and their respectively aligned steering elements form the steering means for the torpedo during its flight.

The stabilizing means comprises two diametrically opposite wings 31 and 32 secured to the casing 27. The wings are provided, respectively, with pivoted ailerons 33 and 34 adapted to be moved relatively to their respective wings for preserving lateral balance and limiting rotation of the torpedo in one direction or the other during its flight.

Figure 17:
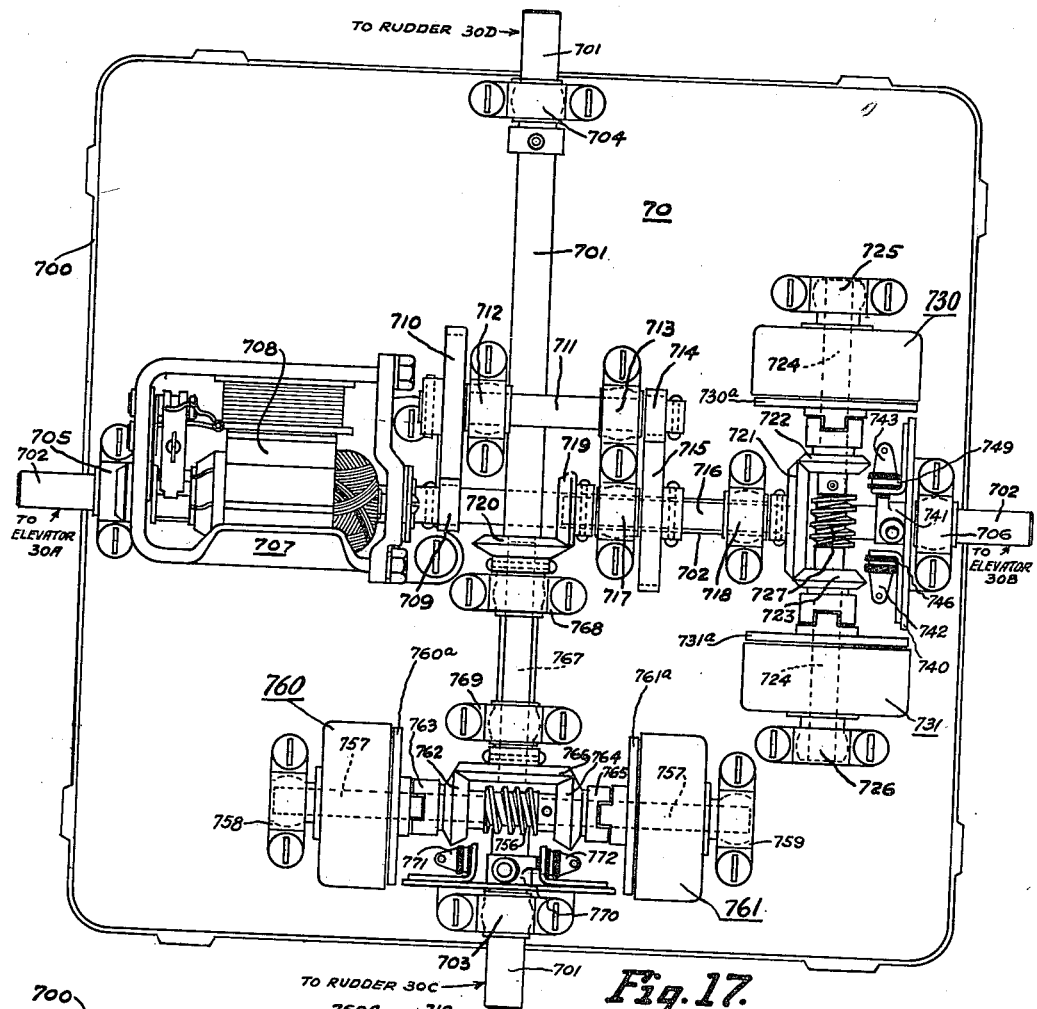
Fig. 17 is a plan view of the operating apparatus for the steering mechanism of the device.
Figure 18:
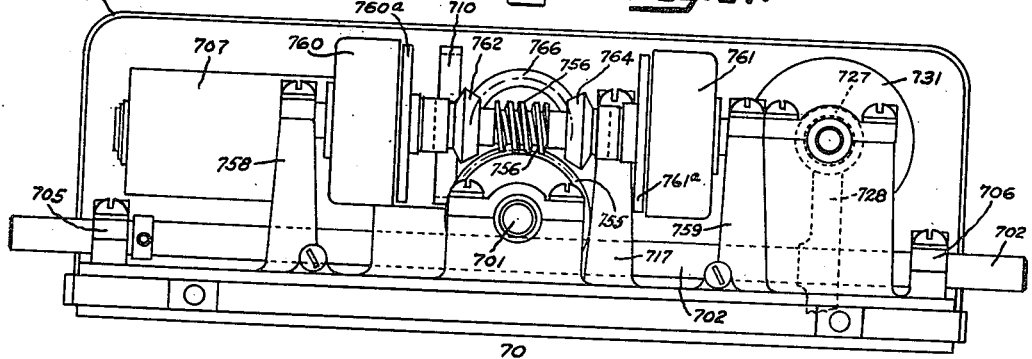
Fig. 18 is a side view of the apparatus shown in Fig. 17.

The elements 30 A–B –C and D of the steering means are actuated by the servo-mechanism referred to as a whole by the numeral 70, Fig. 2, and shown in detail in Figs. 17 and 18. This servo-mechanism operates solely under the control of the optical portion 40 of the device, which is carried in the open, front end of the casing 27. This optical portion 40 is detailedly illustrated in the Figs. 4 and 5.

The ailerons 33 and 34 are actuated by the servo-mechanism 80 which is detailedly illustrated by Figs. 14, 15 and 16. This mechanism 80 is solely under the control of a compass 50 detailedly illustrated by Figs. 6, 7 and 8.

The source of electric power which actuates the entire mechanism is a storage battery 60 carried in the casing 27 as shown in Fig. 2. Adjacent the battery there is provided a container 61 housing suitable terminals to which the two battery wires 62 and 63 lead and from which emanate other wires leading to the trip switch 64, the filament switch 65, the compass 50, the steering servo-mechanism 70, the stabilizer servo-mechanism 80 and the optical portion 40 of the control mechanism. This container 61 also houses certain electrical devices such as power tubes, resistance units, relays, transformers and condensers, the function of which will be described later.

*The optical member*

As shown in Fig. 2, the optical member 40 of the control mechanism is mounted in and is so constructed as to fill the open front end of the casing 27. It comprises a rectangularly shaped housing 401 (see Figs. 3 and 4), to one end of which is attached a conduit 402. The other end of housing 401 is closed by a plate 403, which is an extension of the mounting bracket 404, by means of which the optical member is secured in position within the casing 27. Each one of the four sides of the housing 401 has an opening 405 through which extends a photo-electric tube carried by a plate 407. This plate is secured to the housing 401 by two screws 408 which pass through arcuate slots 409 cut in the wall of housing 401 so as to be concentric with the opening 405 therein and threadedly engage the plate 407. This permits rotative adjustment of the tube carrying plate 407 within a certain range.

Each one of the four photo-electric tubes 931A, 931B, 931C and 931D is provided with a protective shield 410 having a removable cap 411. Each shield 410 is cylindrical in shape and has a side opening 412 the center of which aligns with the light shield through which the incident light enters the tube to impinge upon the first cathode surface. The outer surface of the shield about the side opening 412 is of spherical shape as shown at 413. This provides a swivel mount for the similarly shaped flanged end 414 of the cup member 415 which carries the hood 416 in which a lens 417 is secured. This lens is coaxial with the opening 412 of the tube hood 410. Thus the four lens-carrying hoods 416 may be adjusted on their respective swivel mounts 413. For purposes of description the four lenses 417 of the respective four photo-electric tubes 931A, 931B, 931C and 931D will be referred to hereinafter as 417A, 417B, 417C and 417D as marked in Fig. 4.

Figure 21:
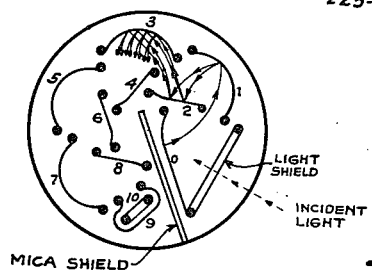
Fig. 21 is a diagrammatic view illustrating one of the multiplier phototubes used in the present invention.

Any suitable type of photoelectric cell or tube, designated by the numeral 931 may be used. In the present instance multiplier phototubes known on the open market as RCA-931, 9-stage electrically focused type are used. This is a high-vacuum phototube in which the photocurrent produced at a light-sensitive cathode is multiplied many times by secondary emission occurring at successive dynodes within the tube. It is capable of multiplying feeble currents produced by weak illumination as much as 2,000,000 times. The resultant output current is a linear function of the exciting illumination under normal operating conditions. Since secondary emissions occur almost instantaneously, frequency response of this particular phototube is flat up to frequencies at which transit time becomes a limiting factor. Referring to Fig. 21, which shows a schematic arrangement of one of the multiplier photo-electric tubes, the cipher 0, indicates the photocathode, the numeral 10 indicates the anode, and the numerals 1 to 9 the dynodes. This type of tube utilizes the phenomenon of secondary emission to amplify signals composed of electron streams. In the multiplier phototube, represented in Fig. 21, the electrons emitted from the illuminated photocathode are directed by the fixed electrostatic fields along curved paths to the first dynode (secondary emitter). The electrons impinging on the dynode surface produce many other electrons, the number depending on the energy of the impinging electrons. These secondary electrons are then directed to a second dynode and knock out more new electrons. This multiplying process is repeated in each successive stage, with an ever increasing stream of electrons, until those emitting from the last dynode (dynode No. 9) are collected by the anode and constitute the current utilized in the control of the operating circuits of the driving means of the mechanism which operates the steering apparatus. A plurality of terminals 418 extend from each tube and are connected to the proper electrical devices through wires leading from the conduit 402 in the form of a cable 67 to the box or power pack and amplifier unit 61.

The optical member just described controls the operation of the steering mechanism of the torpedo. This steering mechanism, as has been previously said, comprises four fins 29A, 29B, 29C and 29D each secured to the casing 27 in any suitable manner and at right angles thereto, each two alternate fins being diametrically opposite. In alignment with the fins are steering elements 30A, 30B, 30C and 30D respectively, each element being rotatably supported upon the casing 27 so that each element may be moved out of planar alignment with its respective fin in either direction.

Steering mechanism

The servo-mechanism 70 for moving the steering elements under the effect and control of the optical member 40 is illustrated in the Figs. 17 and 18. This mechanism is housed in a box 700 secured within the casing 27 near its tail end. Two shafts 701 and 702 arranged at right angles relatively to each other extend centrally through said box 700, the shaft 701 being above the shaft 702 as shown in Fig. 17, each end of a shaft extending outside the confines of box 700 and being connected operatively with an element in any suitable manner so as to be capable of shifting said element.

Shaft 701 is supported by bearing standards 703 and 704 and shaft 702 by bearing standard 705 and 706. An electric motor 707 is secured in the box 700, the shaft of the armature 708 thereof aligning with but lying a a plane above the axis of shaft 702. The shaft of armature 708 of the motor has a pinion 709 pinned thereto, this pinion operatively engaging gear 710. This gear is pinned to counter shaft 711 supported by bearing standards 712 and 713 and at its end opposite the gear 710 has a pinion 714 secured thereto. Pinion 714 operatively engages a gear 715 pinned to shaft 716 rotatably supported by bearing standards 717 and 718. At the end of shaft 716, extending outside bearing standard 717, there is secured a bevel pinion 719 meshing with a similar bevel pinion 720. At the end of shaft 716 extending outside the bearing standard 718 there is secured a bevel gear 721 which is in constant mesh with two bevel pinions 722 and 723 rotatably supported upon a shaft 724 journalled in bearing standards 725 and 726. Shaft 724 has a worm 727 attached thereto between the two bevel gears 722 and 723, said worm operatively engaging a worm gear 728 (shown in dotted line in Fig. 18), which is attached to shaft 702. Thus the worm 727, acting through the worm gear 728, drives shaft 702. The pinions 722 and 723 are rotatably mounted upon a non-magnetizable shaft 724 and can drive it only through a clutch mechanism which, in the present invention, is magnetically operated. The clutch mechanism through which pinion 722 is adapted to rotate shaft 724 in one direction is designated by the numeral 730, while the numeral 731 indicates a similar mechanism through which pinion 723 rotates shaft 724 in the opposite direction.

In the present invention six similar clutches 730, 731, 760 and 761 of Fig. 17, and 840 and 850 of Fig. 14 are utilized to connect a driving element with an element to be driven at the proper time and direction, therefore for the sake of brevity, only one will now be described in detail, reference being had to Fig. 14 in which one clutch 840, of the stabilizing mechanism, however, is shown in section.

In Fig. 14, the two driving bevel pinions 822 and 823 (similar to 722 and 723) are carried on shaft 824 so as to be rotatable relatively thereto. Shaft 824 is of non-magnetic material. Pinions 822 and 823 mesh with bevel gear 821 which is pinned to shaft 802, thus one pinion 822 is normally driven in one direction on shaft 824 and the other pinion 823 in the opposite direction. Between the pinions 822 and 823 a worm 827 (similar to 727) is pinned to shaft 824. A spacing collar 828 is pinned to shaft 824 between the worm 827 and pinion 822 to keep pinion 822 in mesh with gear 821. A magnetic disc 835 which rotates in one direction when the motor 881 is rotating is supported by shaft 824, but is not normally drivingly connected therewith.

Surrounding the shaft 824 there is a driving joint which connects pinion 822 with disc 835 while permitting the latter to move along the shaft 824. This joint comprises a sleeve 837a attached to pinion 822 and having notches which receive lugs integral with disc 835. This construction is shown best with respect to the corresponding parts associated with clutch 850. There, the pinion 823 has a part 837 having notches which receive lugs 838 integral with a disc 839 which corresponds to disc 835 of clutch 840.

The magnetic clutch 840 has a housing comprising an extending hub portion 841, swivelly secured in the bearing standard 842 and supporting shaft 824 and also a shell portion 843. In this shell portion 843 there is secured the electromagnet windings 844 provided with insulating discs at each end surface. A friction, thrust collar 845 is pinned to shaft 824 between the housing of clutch 840 and the shiftable magnetic disc 835. A ball bearing 846 is interposed between the housing of clutch 840 and the collar 845. Normally there is no frictional contact between the collar 845 and the magnetic disc 835. Energization of the magnet windings 844 will set up magnetic flux in the circuit comprising housing 843 of clutch 840, collar 845 and disc 835, all of which are made of magnetic material so that the disc 835, constantly driven in one direction due to the sliding mechanical connection with the pinion 822, will be brought into frictional engagement with the collar 845 resulting in a rotation of said collar with said disc. The collar 845 being pinned to shaft 824 will thus rotate this shaft in the direction of the rotation of pinion 822. At least one of the bearing races of balls 846 must be square in cross section to prevent freezing of the balls due to magnetism. The ball race construction shown in Fig. 14 provides for by-passing the magnetic flux around the balls.

Likewise, if the electromagnet windings of clutch 850 be energized, then the magnetic disc 839 would be attracted and moved to connect the shaft 824 with the pinion 823, which, rotating in a direction opposite to pinion 822, would thus cause a reverse rotation of shaft 824. The shaft 824 and the worm 827, pinned thereto, always rotate together; and, consequently as the worm is rotated in one direction or the other, the worm gear 851 with which it meshes will also be driven in either direction.

From the foregoing description of the construction and operation of magnetic clutches 840 and 850 of the present invention it may clearly be seen that if the clutch 730 (Fig. 17) is energized, its disc 730a will become effective operatively to connect pinion 722 to shaft 724 causing said shaft to be rotated in the direction of said pinion. However, if the clutch 731 is energized, then the disc 731a becomes effective to connect the shaft 724 with the pinion 723, which, rotating constantly in a direction opposite to the rotation of pinion 722, will rotate the shaft 724 in said opposite direction. As the shaft rotates so also rotates the worm 727 pinned thereto and consequently reversed rotation of the worm will result in a reversed rotation of the shaft 702 upon which is secured the worm gear 728 (Fig. 18).

These two electro-magnetic clutches 730 and 731 come under the direct control of the two photoelectric tubes 931A and 931B. As these two tubes are variably affected by the light of the traget toward which the torpedo is directed, they in turn will control or effect the energization or deenergization of the two electromagnet clutches.

The mechanism including electromagnetic clutches 730 and 731 is provided to operate the elevators 30A and 30B of the torpedo under the control of tubes 931A and B of the optical apparatus 40. The ends of shaft 702 are operatively connected to elevators 30A and 30B respectively so that rotation of shaft 702 in one direction by the energization of one of the electromagnetic clutches 730 and 731 will move said elevators 30A and 30B out of alignment with their respective fins 29A and 29B in one direction. On the other hand, if the shaft 702 is rotated in the opposite direction due to the energization of the other of said electromagnetic clutches 730—731, then the elevators 30A and 30B will be rotated out of alignment with their respective fins in the opposite direction. This action of the elevators 30A and 30B will cause the torpedo to swerve up or down as regards Fig. 2 under the control of the photo-electric tubes 931A and 931B of the optical apparatus. This movement of the elevators in either direction must be held within a predetermined range and therefore a limiting device in the form of a switch is provided.

The switch for limiting the action of either of the magnetic clutches 730 or 731 is operated by the shaft 702 which, as has been said, actuates elevators 30A and 30B. The switch is shown in elevation in the Fig. 17; however, for purposes of detailed description reference also will be made to the Fig. 16 which is a front view of one of these switches of which there are three used in the present invention. The switch actuating shaft 860 of Fig. 16 corresponds to the switch actuating shaft 702 of Fig. 17. To the shaft 860 is attached the non-conducting actuator cam 861. A supporting plate 862, secured to the bearing standard 863 which cooperates with a similar bearing standard 864 to support shaft 860, has two upturned ears 865 and 866. Ear 865 insulatingly carries a substantially rigid plate 869 provided with contact 870 and a flexible blade 867 provided with a contact 868, said contacts normally engaging. Blade 867 has an angular end which is engaged by the actuator cam at a certain point in its clockwise movement as regards Fig. 16 for opening said contacts. On ear 866, opposite ear 865, there is insulatingly secured a rigid plate 874 having a contact 873 and a flexible blade 871 having a contact 872. Blade 871 has an angular end engageable by the actuator cam 861 to separate contacts 872 and 873 at a certain point in the counterclockwise rotation of said cam 861.

When actuator cam 861 is in its normal position it does not engage either flexible blade 867 or 871, thus contacts 868—870 and 872—873 are in engagement respectively. However, as the shaft 860 is rotated in one direction (as for instance clockwise as regards Fig. 16) it will, at a predetermined point in this directional rotation, engage the angular end of blade 867, flex and move it so as to disengage its contact 868 from the contact 870, thus breaking a circuit for purposes to be described. Reverse rotation (counterclockwise) of the cam 861 causes eventual separation of contacts 872—873 to break another circuit. This is diagrammatically shown in Fig. 20.

Figures 20, 22:
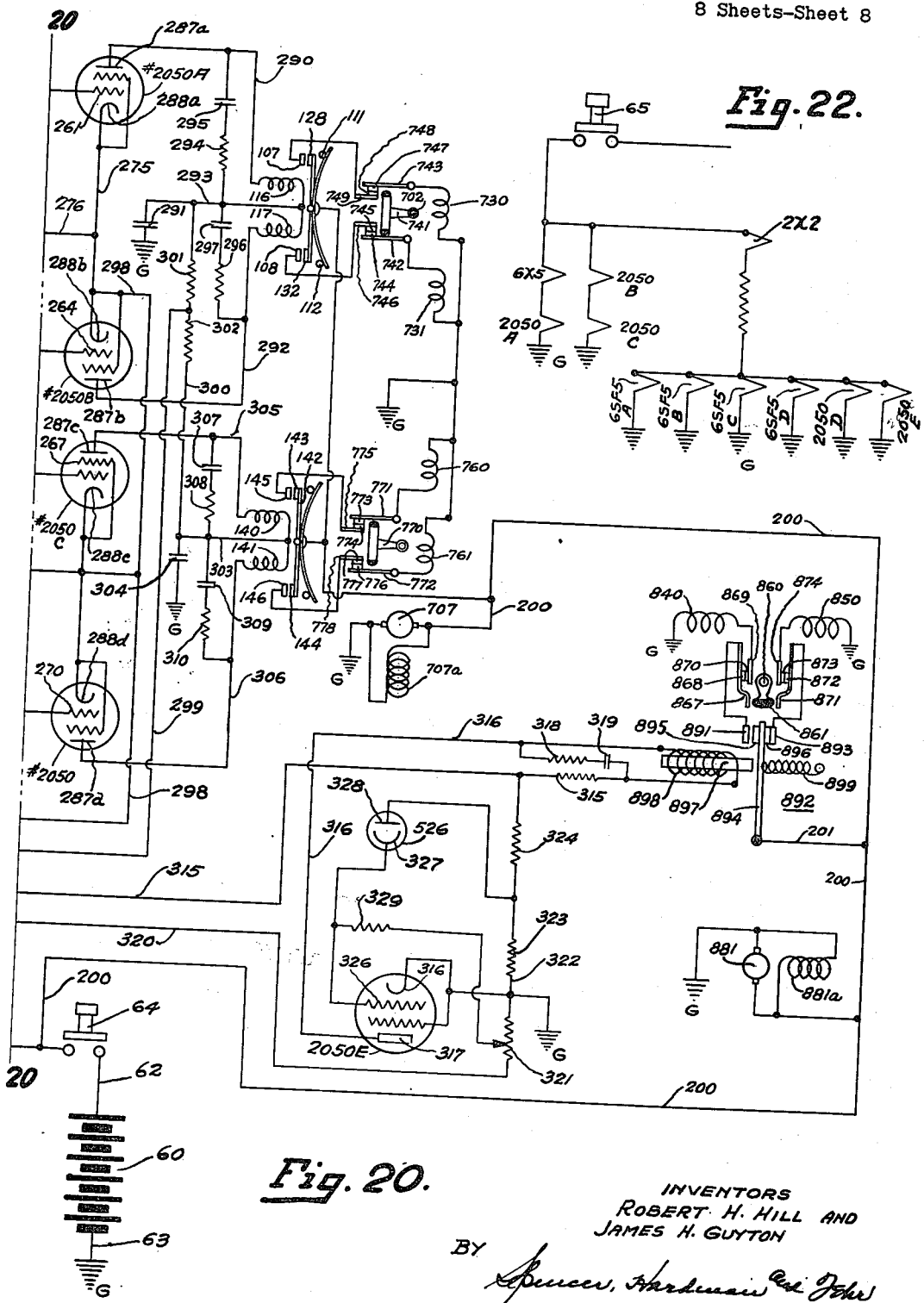
Fig. 22 is a schematic showing of the circuits of all heating elements of the various tubes.

The mounting plate of the switch mechanism actuated by shaft 702 for controlling clutches 730 and 731 is designated by the numeral 740. The flexible blade on one side of the actuator cam 741, is indicated by the numeral 742 and the flexible blade on the other side of the said cam by the numeral 743. Blade 742 has a contact 744 (see Fig. 20) which normally engages the contact 745 carried by the rigid plate 746. Blade 743 has a contact 747 normally engaging contact 748 on plate 749. Rotation of shaft 702 clockwise in Fig. 20 is limited by the separation of contacts 747—748 by cam 741; and in the counterclockwise direction by the separation of contacts 744—745 by cam 741.

Referring again to Figs. 17 and 18, shaft 701 has its ends respectively connected to rudders 30C and 30D so as to be adapted to move them out of alignment with their respective fins 29C and 29D. This shaft 701 has a worm gear 755 (Fig. 18) attached thereto, said gear meshing with a worm 756, pinned to the clutch shaft 757 which is journalled in bearing standards 758 and 759 (Fig. 17). Two electromagnetic clutches 760 and 761, provided with magnetic armature discs 760A and 761A respectively, are associated with shaft 757 in the same manner as clutch armature discs 835 and 839 are associated with shaft 824. A bevel pinion 762 is rotatably supported on shaft 757 and is operatively connected with disc 760A by coupling 763. A similar pinion 764 on shaft 757 is operatively connected with disc 761a through coupling 765. Both pinions 762 and 764 mesh with and are driven by a bevel gear 766 pinned to shaft 767 which is journalled in bearing standards 768 and 769. The end of shaft 767, opposite the bevel gear 766 has a bevel pinion 720 pinned thereto which meshes with pinion 719 secured to shaft 718 which, as has been previously described, is driven by the electric motor 707 through the train of gears 709, 710, 714, and 715.

Like shaft 702, shaft 701 operates a control switch mechanism for clutches 760 and 761. This mechanism is identical with the mechanism shown in Fig. 16. The actuator cam 770 is attached to and rotated by shaft 701. The flexible contact blades 771 and 772 are adapted to be engaged and moved by this actuator cam 770. By referring to the diagram (Fig. 20) blade 771 has a contact 773 cooperating with a contact 774 on rigid plate 775. Likewise flexible blade 772 has a contact 776 cooperating with contact 777 on plate 778. When energization of the electromagnetic clutch 760 has caused pinion 762 to be connected with shaft 767 and the connected shaft 701 to be rotated in one direction a predetermined amount, the actuating cam 770 will separate contacts 773 and 774 to effect deenergization of said clutch 760 thereby disconnecting pinion 762 from shaft 757. On the other hand, if the electromagnetic clutch 761 is energized, the pinion 764 is operatively connected to shaft 757 whereby shaft 701 will be rotated in the opposite direction until the actuator cam 770 engages flexible blade 772 to move its contact 776 out of engagement with contact 777 and thereby render the clutch 761 inactive and stop rotation of shaft 701 in the opposite direction. It will be understood that as shaft 701 thus is rotated in one direction or the other, the rudders 30C and 30D, connected to the ends of shaft 701 will be moved out of alignment with their respective fins 29C and 29D in one direction or the other.

Reference to the Fig. 2) will show that the two sets of contacts of each limit switch mechanism of the steering apparatus viz., 747—748 and 744—745 of one mechanism and 773—774 and 776—777 of another, are normally engaging and thus making circuit connections for the respective circuits of these clutches however, these circuits are normally held open by the contacts of a walking beam relay detailedly illustrated by the Figs. 9 to 13 inclusive.

The relay comprises a rectangularly shaped base 100 each side of said base having an integral portion thereof bent at right angles thereto to form two pairs of oppositely disposed, upstanding arms. The two arms at the narrower ends of the base are designated by the numerals 101 and 102. The arms on the longer sides of the base are numbered 103 and 104. Each arm 101 and 102 has two angular brackets insulatingly attached thereto. The brackets of arm 101 are marked 105 and 109; and those of arm 102 are marked 106 and 110. Bracket 105 adjustably carries a contact screw but indicated 107 and the bracket 106 carries a contact screw 108.

The upstanding arms 103 and 104 of the relay base 100 support the walking beam armature assembly 115 which is rotatively supported and thus adapted to be actuated by energization of either of the two relay coils 116 and 117 attached to the base 100. Arm 103 carries a fulcrum screw pin 118 having a shank portion threaded in said arm so as to render the pin 118 adjustable relatively thereto. The pin 118 is turned so as to cause its inner conical end to engage the similarly shaped end of the central bore in a spool 122. Further turning of pin 118 causes arm 103 to back away from the spool to provide a suitable air gap in the magnetic circuit which includes the spool 122 and the arm 103. A lock nut 119 keeps the pin 118 in proper location. A similar screw pin 120 is threadedly supported by arm 104 and is locked in adjusted position by the nut 121. The spool shaped armature-hub 122, bored out at each end to receive the oppositely disposed and axially aligned fulcrum screw pins 118 and 120, is thus pivotally supported between the two arms 103 and 104 by said pins which prevent axial movement of the hub 122. On diametrically opposite sides of the hub 122 are cut longitudinal slots 124 and 125 which respectively receive rigid, magnetizable armature plates 127 and 131 which lie under flexible non-magnetizable plates 126 and 130. Each of the plates 126 and 130 is bifurcated to provide two forks. One fork of plate 126 engages a stop screw 111 on bracket 109 and the other fork of plate 126 carries a contact 128 adapted to engage the stationary contact 107 on bracket 105. One fork of plate 130 engages a stop screw 112 on bracket 110 and the other fork carries a contact 132 adapted to engage contact 108 on bracket 106. Both plates 126 and 127 are anchored in the slot 124 of the hub 122; and both plates 131 and 130 are anchored in the slot 125 of hub 122. By the engagement of the flexible plates 126 and 130 with the adjustable stop screws 111 and 112, the armature 115 is held in such position that the pairs of contacts are normally separated. Energization of relay winding 116 attracts and moves the armature counterclockwise (Fig. 10), to bring contact 128 into engagement with contact 107 while energization of relay winding 117 moves the armature clockwise to cause engagement of contact 132 with contact 108. Only one pair of contacts can be engaged at a time.

In the diagrammatic view Fig. 20, the relay just described is shown controlling the windings of clutches 730 and 731. A similar relay shown diagrammatically immediately below this relay controls the clutches 760 and 761. For purposes of description of said circuit diagram to be described in detail later in this specification, the two relay windings of the second relay are designated by the numerals 140 and 141 and the armature by numeral 142. Contacts 143 and 144 on the armature cooperate with stationary contacts 145 and 146 respectively.

The field of vision of the four, lensed, photoelectric tubes 931A, 931B, 931C and 931D is of such a scope as to hold the flight of the torpedo, as it digresses from its direct path toward the target, to a minimum. These tubes operate to provide a control according to the following tabulation:

| Change of course | Controlling photoelectric tubes | energized relay coil | energized clutch | direction of movement of steering members | direction of movement torpedo nose |
|---|---|---|---|---|---|
| down | 931A | 116 | 730 | elevs. up (Fig. 2) | up. |
| up | 931B | 117 | 731 | elevs. down (Fig. 2) | down. |
| left | 931C | 140 | 760 | rudders right (Fig. 1) | right. |
| right | 931D | 141 | 761 | rudders left (Fig. 1) | left. |

For instance, if the torpedo digresses from its direct path toward the target in an upwardly direction, tube 931A will be moved out of effective light range and tube 931B will be brought into a position where more intensive light rays from the target will strike it, causing its excitation and a resultant operation of the elevators 30A and 30B downwardly so that the tail of the torpedo is raised and the nose lowered. This will cause the torpedo to veer from its digressing, upward path, downwardly toward its direct course. This veering of the torpedo downwardly continues until tube 931B is moved out of effective range of target light and rendered inactive and the tube 931 is moved into effective range so that the more intensive rays of target light strike it and render it active. Now the circuit and electrical devices associated with tube 931A will become effective to shift the elevators upwardly, thereby lowering the tail and raising the nose of the torpedo, so that the torpedo having passed beneath the direct path of travel toward the target due to the elevators having been shifted downwardly by tube 931B, will now veer upwardly toward its direct path of travel. The shifting of the path of torpedo travel by operation of the elevators 30A and 30B is so limited by the control mechanism that at no time does the torpedo move a substantial distance upwardly or downwardly out of its direct path of travel toward the target, for as soon as one tube 931A or 931B is rendered ineffective, the companion tube is rendered effective and takes control to again return the torpedo to its direct path toward the target. The same is true regarding the control of the rudders 30C and 30D by the tubes 931C and 931D for effecting return of the torpedo to its direct path toward the target after having digressed to the right or left from said path.

If for any reason, the torpedo swerves out of its direct path toward the target in the other direction, that is, either right or left of the longitudinal axis (Fig. 1 of the drawings), then rudders 30C and 30D come into play to return the torpedo to its true course. These two rudders 30C and 30D come under direct control of the photo-electric tubes 931C and 931D. As long as the torpedo remains on its true course, as viewed in Fig. 1, tubes 931C and 931D remain in what might be termed "balanced excitation." However, as the torpedo swerves from this course (right or left as viewed in Fig. 1) the excitation of one or the other of said tubes will increase and thus this tube becomes predominant and the circuit of the other tube to be weakened and thereby causes movement of the rudders 30C and 30D out of alignment with their respective fins 29C and 29D to correct this deviation in the flight of torpedo in either direction.

The photocells are so sighted that there is purposely a blind spot or dead area located between the areas covered by the cells. This arrangement provides for an interval between the release of predominating control by one cell and the taking over of the control by the other cell of the same pair. Therefore, when the nose of the torpedo starts veering from its course toward the target and a certain cell of a pair of cells should take control, its field of influence will not be infringed upon by the other cell of the same pair. As will be described later with reference to Figs. 19 and 20, the slight predominance of the circuit of one photo-cell causes a degeneration and weakening of the effect of the circuit of the other photo-cell of the same pair. Therefore when one cell of a pair becomes slightly predominate, the stronger cell takes over control and the weaker cell releases control. Since there may be a veering from course up or down concurrently with a veering from course left or right, a tube of one pair (931A—931B) may have control concurrently with a tube of the other pair (931C—931D).

Stabilizing mechanism

The torpedo, under certain circumstances, may have a tendency to rotate excessively during its flight, which would cause it to deviate substantially from its direct path toward the target. To eliminate the tendency of the torpedo to so rotate, there is provided a stabilizing mechanism comprising two diametrically opposite wings extending from the torpedo and each provided with an adjustable aileron. These ailerons are operated by mechanism illustrated by the Figs. 14, 15 and 16, this mechanism operating under the control of the compass illustrated in Figs. 6, 7 and 8.

In Figs. 1 and 2 the torpedo is shown provided with oppositely extending wings 31 and 32 having adjustable ailerons 33 and 34 respectively. One of these ailerons is operatively connected to the end of shaft 860 extending from the box or housing 879 containing the stabilizer servomechanism 80, while the other of said ailerons is connected so as to be operated by the shaft 880 the end of which also extends outside the said housing 879.

An electric motor 881 is provided in housing 779, said motor having a shaft 882 to which a bevel pinion 883 is secured. This pinion 883 meshes with a bevel gear 884 secured to one end of the shaft 802, supported by bearing standards 802a and 802b, the other end of said shaft having the bevel gear 821 attached thereto. Thus it may be seen that motor 881 constantly rotates gear 821 and therefore the pinions 822 and 823 meshing therewith.

It has previously been described how the energization of electromagnetic clutch 840 connects the pinion 822, rotating in one direction, with the shaft 824 to rotate said shaft in the same direction. Also how the energization of electromagnetic clutch 850 connects pinion 823 with shaft 824 to rotate it in the opposite direction. Thus the worm 827, pinned to shaft 824 will rotate with said shaft in the one or the opposite direction depending upon which electromagnetic clutch 840 or 850 is energized.

The worm 827 meshes with a worm gear 851 attached to shaft 885 which is journalled in bearing standards 886 and 887. Shaft 885 has a bevel pinion 888 secured thereto which is in constant mesh with two bevel gears 889 and 890. Gear 889 is attached to shaft 880 and bevel gear 890 is pinned to shaft 860 so that as pinion 888 rotates in one direction it will turn bear 889 in one direction and gear 890 in the opposite direction. As shaft 860 rotates, the switch actuating cam 861 will be rotated to actuate contacts of the associated switches. Rotation of cam 861 in one direction opens contacts 868—870 and closes contacts 872—873 while a reverse rotation of the cam opens contacts 872—873 and closes contacts 868—870. When the cam 861 is in normal position, both sets are closed.

The blade 867 which carries contact 868 is connected with one stationary contact 891 of an electromagnetic relay 892. The other stationary contact 893 of this relay is connected to blade 871 which carries contact 872. An armature 894 has a contact 895 normally spaced from but adapted to engage contact 891 while another contact 896 on the other side of the armature normally engages contact 893. An electromagnet comprising core 897 and winding 898 is adapted to attract and move the armature 894 out of its normal position against the effect of spring 899 which yieldably holds said armature in its normal position as shown in Fig. 20.

The relay 892, just described, is under the control of the compass 50 shown in Figs. 1, 2, 6, 7 and 8. Compass 50 comprises a housing member 501 cradled in a gimbal ring 502. This ring is carried by a support attached to the torpedo in a manner as to permit adjustment of the compass for directional control. No detail drawing of this support is provided inasmuch as any suitable type of carrier, capable of securing the compass supporting gimbal ring to the casing 27 so that it may initially be adjusted to proper directional position and thus properly control the torpedo and prevent its rotation during flight, may be used.

Figure 7:
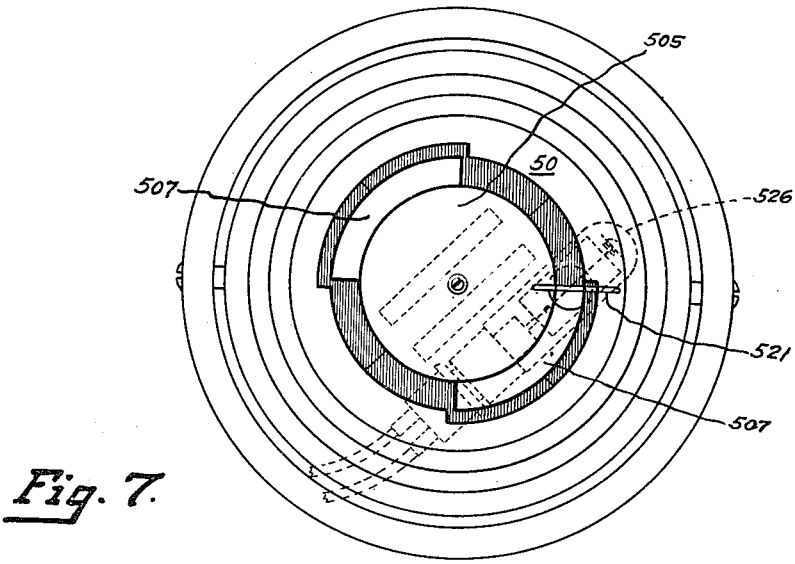
Fig. 7 is a plan view taken along the line 7—7 of Fig. 6.
Figure 8:
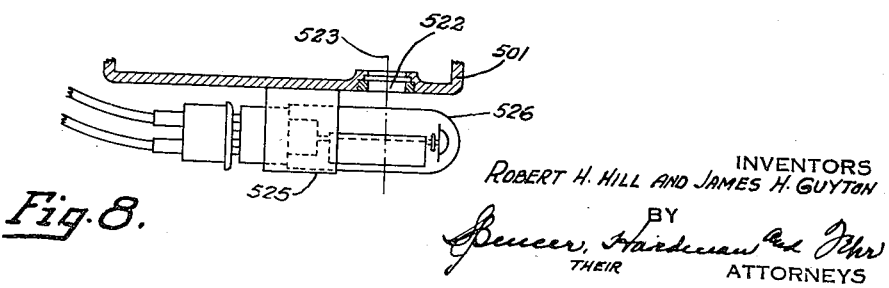
Fig. 8 is a fragmentary, detail view of the photoelectric cell provided on the compass bowl.

The compass itself may be of any suitable, commercial type and inasmuch as the one, illustrated by the Figs. 6, 7 and 8 of the present drawings is one well known and obtainable on the open market no detail description thereof will be given, but just enough to be able to understand its function when used in the present new combination of elements for controlling the flight of a torpedo.

The cup shaped body 501 of the compass is, as has been mentioned, cradled in a gimbal ring 502 by adjustable pins 503.

Cradling of a compass in a gimbal ring such as is shown is a well-known expedient particularly followed in installations of a compass on sea-going vessels. It is well known that the polar responsive rotating element of the compass must at substantially all times be held in substantially horizontal position in order to be operative under the effect of polar attraction. To maintain the polar responsive element of the compass substantially horizontal the instrument is cradled by or in a gimbal ring so that, in response to gravity, the instrument may rock in order to maintain itself in this proper position. In sea-going vessels where considerable rocking of the ship is experienced, the compass is supported in the cradle so that it can rock to permit gravity substantially to hold the instrument so that its polar responsive element is substantially horizontal at all times and consequently under polar effect. In the present instance the Fig. 2 shows the torpedo in a vertical dive position and consequently the axis of the compass unit is vertical to the horizon and the polar operated member or compass card is in a substantially horizontal position in which polar effects may rotate it as the torpedo tends to rotate about its axis. When the torpedo veers from a direct vertical dive into a shallow glide, then naturally, gravity would automatically adjust the compass assembly in its cradle mount, or more particularly the gimbal ring 502 so that the axis of the compass would be maintained vertical with the horizon but would differ relatively to the axis of the torpedo. Thus like the compass on the seagoing vessel, compass 50 is cradled in gimbal ring 502 so that gravity will at all times tend to maintain the axis of the compass at vertical with the horizon and consequently maintain the polar controlled member or compass card 506 thereof horizontal and under the effect of polar attraction.

A pivot pin 504 is centrally provided in the body 501, said pin pivotally supporting the rotatable compass float 505. This float has a compass card 506 provided with a slot 507, said card acting as a shutter to control a light beam as will be described. A tubular extension 508 has one end secured in a counterbored recess in the bottom of housing or body 501, the other end of said tubular extension leading into and being secured to a container 509 forming a chamber 510 in which an expansible member or bellows 511 is contained, said bellows being in communication with the tubular extension 508. An opening 512 in the bottom wall of body 501 connects the interior of said body, housing the float 505, with the interior of the tube 508 and therefore the bellows 511. Any suitable fluid is provided in the housing body 501 to act as a dampening agent preventing undue fluctuation of the floating compass member 505. A fluid not affected by temperature changes is desirable, however, if any expansion of the fluid, due to excessive temperature variations does occur, then the expansible bellows 511 may readily compensate for such variations.

A cover 514 is secured to the body 501 a sealing ring 515 being placed between the cover and body to insure against the leakage of the fluid from the body. A lens 516 is secured within a mounting collar 517 which is adjustably carried by the cover 514. Bracket 518 is insulatingly carried by the cover 514, said bracket supporting an electric lamp 519 so that its filament center is in axial alignment with the lens 516. The spring clip 520, insulatingly attached to the cover 514 provides a contact for the electric lamp. The lens 516 is of such a character that it will concentrate the light from the filament of lamp 519 into a narrow ribbon-like beam of predetermined dimensions. The size and shape of this light beam is indicated at 521 in Fig. 7.

In the bottom wall of the body housing 501 there is provided a window 522, sealed so as to prevent the leakage of fluid therethrough. This window is circular in shape the center thereof being in direct alignment with the center of the slot 507 in the compass float card 506 and the center of the lens 516. The dot and dash line 523 shows the path of the light beam from lamp 519 centrally through the said lens, compass card slot and window. A spring mounting clip 525, attached to the outer side of the bottom wall of housing body 501, carries a photo-electric tube 526 in such a manner that it lies directly under window 522 and that its cathode plate is in alignment with the light beam indicated by the dot and dash line 523 and passing axially through said window.

At the time of releasing or launching the torpedo from the airplane or airship carrying it, the switches 64 and 65 are tripped, in any suitable manner, so as to close their respective circuits. Closing of switch 65 completes the circuits of the cathode heaters of the amplifying tubes. When the switch 64 is closed the circuits from the source of electrical energy, a storage battery 60 are completed. Now both electric motors 707 and 881 are rendered operative through the following circuits; from battery 60 through wire 62 across switch 64, wire 200 and for motor 881, across its armature and through its field winding 881a back to battery through ground G. For motor 707, from wire 200 across the armature and through field winding 707a back to battery through ground G.

Fig. 20 shows that as soon as these battery circuits to motors 707 and 881 are completed the following circuit is also completed, from wire 200 through wire 201 to the armature 894, across contacts 896 and 893, to flexible blade 871 thence across contacts 872 and 873, blade 874 to electromagnet 850 and back to the battery via the ground connection. As has been stated previously, energization of electromagnet 850 connects shaft 824 with pinion 823 which is driven through gears 821 and 884 and pinion 883 by the electric motor 881. Now shaft 824 and its worm 827 are driven in one direction resulting in the rotation of shafts 860 and 880, one in one direction and the other in the opposite direction. The driving connections between worm 827 and said shafts are as follows: worm gear 851 on shaft 885 (Fig. 15), which has pinion 888 attached thereto and which meshes with bevel gears 890 and 889 secured to shafts 860 and 880, respectively. The ailerons 33 and 34 of wings 31 and 32 respectively being operatively connected to the shafts 860 and 880 respectively, it follows that rotation of said shafts in opposite directions as just described will likewise adjust said ailerons in opposite directions causing the torpedo to be thrown into a rotative movement in one direction about its longitudinal axis.

Prior to the release or launching of the torpedo and with the directional location of the target known, the compass will have been adjusted so that the compass card, acting as a shutter fully interrupts the beam of light from lamp 519 to the photoelectric cell or tube 526 thereby rendering said cell or tube inactive. With the cell or tube 526 inactive, the electromagnet 898 is deenergized and rendered inactive thus permitting the circuit to the motor 881 to remain effective. However, when, due to the rotation of the torpedo in consequence of such motor operation and resultant aileron adjustment, the body 501 of the compass, which is secured to the torpedo, rotates relatively to the polar attracted compass float 505 thereby shifting the light ray (line 523) so that it comes into alignment with the slot 507 in the compass card 506 and passing through said slot, passes through window 522 and strikes the cathode of the photoelectric cell or tube 526 rendering it active whereby the electromagnet 898 will be energized causing its armature 894 to be attracted against the effect of spring 899 so that contacts 893 and 896 are disengaged to discontinue the circuit through electromagnet clutch 850 and contacts 891 and 895 are engaged to render the electromagnet clutch 840 active by completing the circuit thereto across contacts 868 and 870 of the limit switch (see Fig. 20). Now the shafts 860 and 880 will each be rotated in the opposite direction from that resulting from energization of clutch 850. This reversal of rotation of shafts 860 and 880 results in an adjustment of the ailerons 33 and 34 to effect a rotation of the torpedo in the direction opposite to that initially established and described in the aforegoing. As the torpedo so rotates the body of compass 50 will likewise be rotated relatively to the substantially polar fixed compass float so that again the solid part of its compass float card is brought into the path of the light beam from lamp 519 to interrupt this beam and therefore render the photoelectric tube or cell 526 inactive. As a result of the inactivity of said tube, the electromagnet 898 is deenergized and its spring 899 will return the armature to the position in which contacts 893 and 895 are again closed. From this it may be seen that extended rotation of the torpedo about its longitudinal axis is substantially prevented, the compass control acting automatically to adjust the ailerons 33 and 34 from one side or position to the other intermittently so as to cause a like intermittent but limited rotation of the torpedo itself. The adjustments of the ailerons are limited by the switches including contacts 868—870 and 872—873 respectively. When motor 881 has rotated shaft 860 a predetermined distance in one direction or the other the cam 861 will cause disengagement of one or the other of said pairs of cooperating contacts and thus terminate rotation of the shafts 860 and 880 in that direction.

Figure 19:
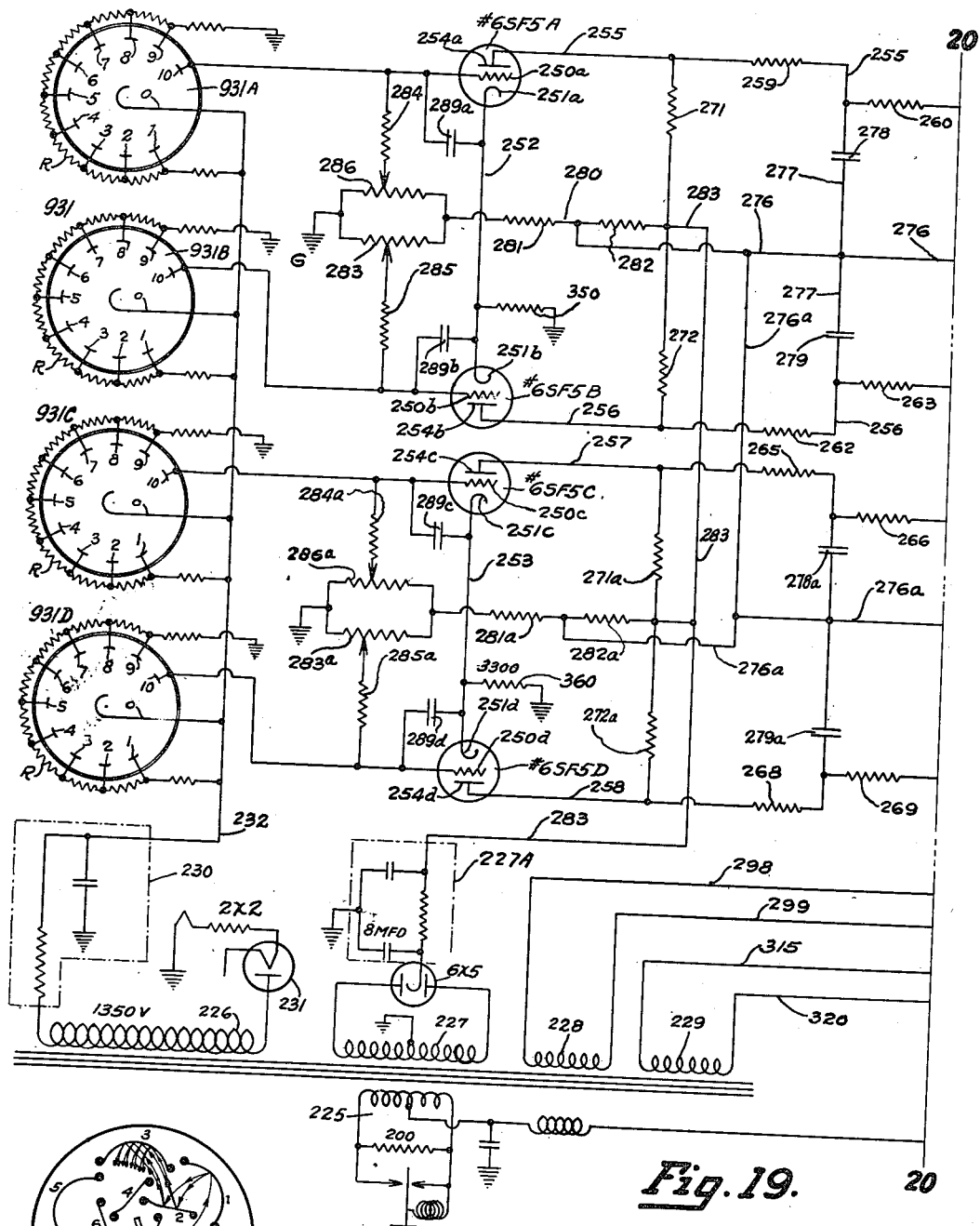
Figs. 19 and 20 are associate diagrammatic views, split by the common dividing line 20—20 illustrating all of the elements of the control mechanism and their electrical circuits and connections.

The four multiplier photoelectric tubes 931A—931B—931C and 931D are illustrated diagrammatically in Fig. 19. The Fig. 21 is a schematic arrangement of this 9 stage electrically focused type of tube. The ciphers 0 designate the photocathodes of the tubes, the numerals 1 to 9 the dynodes and 10 the anodes of the tubes. A ring of voltage dividing resistances about each tube is marked R.

The photocathodes 0 of all of the tubes 931 series are connected to a common wire 232 which is connected to one side of a filter 230, the other side being connected to one end of the secondary winding 226 of the D. C. to A. C. converter 226. The other end of said secondary winding is connected to the half wave rectifier type 2X2 designated by the numeral 231.

The anode 10 of each tube 931A—931B—931C and 931D is connected to the grid 250a—250b—250c and 250d of the voltage amplifying tubes 6SF5A—6SF5B—6SF5C and 6SF5D respectively. The cathodes 251a and 251b of tubes 6SF5A and 6SF5B respectively are connected together by a wire 252. Similarly cathodes 251c and 251d of tubes 6SF5C and 6SF5D are connected together by a wire 253. Plates 254a—254b—254c and 254d of the respective tubes 6SF5A—6SF5B—6SF5C and 6SF5D have wires 255, 256, 257 and 258 respectively connected thereto. Wire 255 leading through two resistance units 259 and 260 connects with the grid 261 of the trigger tube 2050A. Wire 256 connects with the two resistances 262 and 263 and grid 264 of trigger tube 2050B. Wire 257 connects with resistances 265 and 266 and grid 267 of tube 2050C while wire 258 connects with resistances 268 and 269 and grid 270 of trigger tube 2050D. Two resistances 271 and 272 are connected in series between wires 255 and 256 while two similar resistances 271a and 272a are connected in series between wires 257 and 258. The cathodes 288a and 288b of trigger tubes 2050A and 2050B are connected together by wire 275 to which a wire 276 is connected. This wire 276 also connects with a wire 277 connected between wires 255 and 256 between resistance units 259—260 and 262—263 respectively, said wire 277 having a condenser 278 between wires 276 and 255 and a condenser 279 between wires 276 and 256. Wire 276 terminates in a connection with wire 280 having two resistances 281 and 282, the latter being connected with resistances 271 and 272 and with a wire 283 leading to one side of a filter 227A the other side of said filter being connected to the full wave rectifier 6X5 fed by the secondary winding 227. Resistance 281 is connected to one end of two parallel resistances 286 and 283 forming a voltage divider which is grounded at G. A resistance 284 is connected to the wire between anode 10 of tube 931A and grid 250A of tube 6SF5A and adjustably contacts resistance 286. A similar resistance 285 connects with wire of anode 10 of tube 931B and adjustably contacts resistance 283. Similarly a wire 276a connects between two resistances 281a and 282a the resistance 282a being connected to the wire connecting the two resistances 271a and 272a in series between wires 257 and 258 and also being connected to wire 283. Resistance 281a connects with the one end of parallel resistances 286a and 283A the former being adjustably contacted by a resistance 284a connected also to anode 10 of tube 931C the resistance 283a being adjustably engaged by the resistance 285a connected also to anode 10 of tube 931D. Separate circuits connecting each grid and cathode of the respective amplifier tubes 6SF5A—6SF5B—6SF5C and 6SF5D include the condensers 289a, 289b, 289c and 289d.

In the Fig. 20 tubes 2050A—2050B—2050C and 2050D, known as "trigger tubes" each have a plate 287a—287b—287c and 287d and also cathodes 288a—288d—288c and 288d respectively. Plate 287a is connected by wires 290 electromagnet winding 116 which is also connected to the grounded condenser 291 by wire 293. Plate 287b is connected by wire 292 with electromagnet winding 117 also connected to the condenser 291 by wire 292. Means for retarding or timing the deenergization of windings 116 and 117 comprises a resistance and condenser, the resistance 294 and condenser 295 being connected between wires 290 and 293 and resistance 296 and condenser 297 between wires 292 and 293. The cathodes 288a and 288b are connected by wire 275 to which is connected the wire 298 leading from one end of the transformer secondary 228. The other end of this secondary winding 228 is connected by wire 299 with a wire 300 one end of which connects with the wire 293. Two resistances 301 and 302 are in the circuit of wire 300, resistance 301 between wires 299 and 293 and resistance 302 between wire 299 and the wire 303 connected to the joined ends of electromagnet winding 140 and 141 and also connected to the grounded condenser 304.

Plate 287c of trigger tube 2050c is connected by wire 305 with the one end of electromagnet winding 140. The plate 287d of trigger tube 2050d is connected to electromagnet winding 141 through wire 306. Timing means comprising condenser 307 and resistance 308 is connected between wires 303 and 305 and similar means comprising condenser 309 and resistance 310 is connected between wires 303 and 306.

The circuits for the stabilizing apparatus are as follows:

One end of the transformer secondary winding 229 has wire 315 leading therefrom to the one end of relay winding 898 the other end of said winding 898 being connected through wire 316 to the plate 317 of the tube 2050E. A timing means comprising resistance 318 and condenser 319 is connected across wires 315 and 316. The other end of the transformer secondary winding 229 has a wire 320 leading therefrom and to the one end of resistance 321 the other end thereof being connected to a wire 322 including two resistances 323 and 324 and connected to wire 315. The cathode 316 of tube 2050E is connected to wire 322 between resistances 321 and 323, this juncture being grounded as at G. The grid 326 of tube 2050E is connected to the cathode 327 of tube 526 which, as has been described, is mounted on the compass 50. The plate 328 of tube 526 is connected to wire 322 between resistances 323 and 324. A resistance 329 has one end connected to grid 326 the other end adjustably contacting the resistance 321.

As has been mentioned previously many elements used in the present invention are commercial products known and obtainable on the open market. For instance the four multiplier phototubes 931A–B–C and D are known on the market as RCA-931 of the 9 stage electrically focused type. The four tubes marked 6SF5 are well known A. C. voltage amplifiers. The five tubes marked series 2050 are of standard construction as are the tubes numbered 6X5 and 526. All other electrical devices used such as filters, rectifiers, transformers, voltage dividers or balancers, resistance units and the like are well known and commercially produced. Applicants' invention comprehends the combination of all of these electrical units to cooperate in producing the desired function, that of controlling a torpedo in its flight toward an illuminated target so that said torpedo will not be directed substantially from its direct path toward said target.

The airplane or airship used to launch the torpedo against a chosen target is provided with any suitable bomb rack or bay from which the torpedo may be released at the desired time. Before release, the switches 64 and 65 are in open position. The compass 50 is properly adjusted in accordance with the direction of approach and position of target. In the steering apparatus the rudders are initially in alignment with their respective fins. The ailerons of the stabilizing means are in alignment with their respective wing members. When the airplane, carrying the torpedo, is properly aimed or directed at the illuminated target the torpedo is released and simultaneously switches 64 and 65 are closed. Now the storage battery is connected to the various electrical devices and their circuits and some are rendered active. The transformer winding 226 with its half wave rectifier 231 and filter 230 energize the multiplier photo tubes 931A—931B—931C and 931D forming the optical apparatus of the device and which control the steering mechanism. As has previously been stated tubes 931A and 931B control the servo-mechanism operating the rudders 30C and 30D while tubes 931C and 931D control the rudders 30A and 30B. When rudders 30C and 30D are moved out of alignment with their respective fins 29C and 29D in one or the other direction, the torpedo is guided or urged to the right or left respectively of the longitudinal axis of the torpedo as viewed in Fig. 1, Sheet 1 of the drawings. Moving rudders 30A and 30B out of alignment with their respective fins 29A and 29B in one or the other direction cause the torpedo to move out of its path of flight either to the right or left respectively of the longitudinal plane of the torpedo as viewed in Fig. 2 of Sheet 1 of the drawings.

As long as the torpedo travels directly toward its illuminated target, the intensity of light excitation on all four of these photo tubes is equal and thus their controlling effect is equal or balanced so that no movement of the servo-mechanism, operating the rudders, results. However if the torpedo swerves out of its direct path toward the illuminated target then excitation of the tubes will differ rendering one effective over the other to cause rudder movement. For instance if the torpedo swerves toward the right of the direct path of travel (assuming that the torpedo of Fig. 2 is in flight toward the bottom of Sheet 1 of the drawings), then photo tube 931A would receive the greater light excitation from the illuminated target and would predominate over the tube 931B receiving the lesser light excitation. When the light strikes or is received by the tube 931A, it causes current to flow through the photo-tube and hence a voltage appears at the grid of tube 6SF5A. This voltage is amplified by the tube 6SF5A and is applied to the grid circuit of the Thyratron 2050A. The voltage at the grid of 2050A tube becomes more positive and makes the tube conducting. Current flows through the tube 2050A and thence through the winding 116 of the walking beam relay which is detailedly shown in Figs. 9 to 13 inclusive and which has previously been fully described. This current flow through the now conducting tube 2050A to the relay winding 116 comes from the transformer coil 228. The condenser 251 is used to time the relay, retarding its deenergization substantially. Energization of the relay coil 116 attracts the armature 115 to close contacts 107 and 128 and to keep open the contacts 108 and 132. Now the circuit through the electromagnetic clutch 730 is completed and the servo-mechanism illustrated by Figs. 17 and 18 becomes effective to cause rotation of the rudders 30A and 30B out of alignment with their respective fins 29A and 29B again to bring the torpedo into a path of travel toward its illuminated target so that tubes 931A and 931B will again receive equal light excitation from the illuminated target. If the torpedo swerves from its path in the directly opposite direction or toward the left of the longitudinal axis as regards Fig. 2, then the phototube 931B receives the greater light excitation and acting the same as tube 931A, through the voltage amplifier 6SF5-B and Thyratron 2050-B in this instance, will render said Thyratron 2050-B conducting so that the magnet relay coil 117 will be energized rendering the electromagnetic clutch 731 active whereby the servo-mechanism of Figs. 17 and 18 is reversed in operation and rudders 30A and 30B are again moved to urge the torpedo toward the right as regards Fig. 2 and into its direct path of travel toward the illuminated target.

A voltage divider or balancing device comprising resistances 283 and 286 is provided in the circuits of the voltage amplifiers 6SF5A and B so that with only background light on photocells, the 2050 tubes are nonconducting. The circuit including the cathodes of both voltage amplifiers 6SF5A and B has an electrical unit 350, in the form of a resistance which may be termed a "degenerating resistance" inasmuch as, when both amplifiers 6SF5A and B are adjusted (as above), it is ineffective, however, if one or the other of said amplifiers in effect receives a greater input from the photocell than the other, said degenerating resistance will become effective to minimize the effect of the amplifier receiving the weaker signal.

Multiplier phototubes 931C and 931B are rendered effective to adjust the rudders 30C and 30D as the torpedo veers to the right or left of the longitudinal axis, assuming that reference is had to Fig. 1, and that the torpedo is moving toward the bottom of the sheet of drawings. Tube 931C acts through voltage amplifier 6SF5C and Thyratron 2050C to energize magnet relay winding 140 which closes contacts 143—145 to effect energization of clutch 761 and thus operation of the servo-mechanism of Fig. 17–18 to adjust rudders 30C and 30D for returning the torpedo to its proper path of flight toward the target. Tube 931D acts through voltage amplifier 6SF5-D and Thyratron 2050D to energize relay winding 141 whereby the electromagnet clutch 761 is energized to set the servo-mechanism into operation to adjust rudders 30C and 30D in the opposite direction and to correct for deviation of the torpedo from its proper path toward the target. Like tubes 931A and B, the circuits of tubes 931C and D have an adjustable voltage divider 265. Also a degenerating resistance 360 is provided in the cathode circuit of both voltage amplifiers 6SF5-C and D.

The current for energizing the relay winding 898 of the stabilizing portion of the control device is taken from the transformer winding 229. As long as no light from lamp 519 of the compass strikes the phototube 526, no current from winding 229 will flow to the relay winding 898. However, as soon as the said tube is excited by the light beam from lamp 519 on the compass due to relative rotation of the compass housing 501 and the compass float 505 as a result of turning of the torpedo during its flight, then current from the transformer winding 229 may flow to relay winding 898 to energize it and close certain contacts and open others whereby the servo-mechanism illustrated by Figs. 14 and 15 will be rendered effective to control such torpedo rotation. This circuit includes a trigger tube 2050E which acts like the previously described trigger tubes of the 2050 series. When not properly excited by the current from compass tube 526, trigger tube 2050E will not be conductive to the current from secondary winding 229 to the magnet winding 898. However, when tube 2050E is properly excited to become conductive and perform its triggering function, then winding 898 will be properly energized to control the armature 894.

In the foregoing the use of the term light is not to be construed as limiting the device to the use of visible light. Any electromagnetic radiation which will actuate photo tubes may be used, including infra red light, visible light, or ultra-violet light. By providing the light source and the lens system of the servo unit with suitable light filters the light source may be made invisible to the eye yet still capable of operating the servo control unit. The photo tube may also be of a type specially sensitive to the type of light to be used.

By actual tests satisfactory results were attained when various electrical elements were used having the electrical dimensions as given in the following list:

The resistances marked R in the four tubes 931A–931B–931C and 931D are each 100,000–½w.

The resistance in filter 230=10,000 M (M=1,000 ohms).
The condenser in filter 230=2 mfd.
The secondary winding 226=1350 v.
The resistances 283—286 and 283a—286a=25 M.
The resistances 284—285 and 284a—285a=1500 M.
The resistances 281—282 and 281a—282a=1400 ohms.
The resistances 350—360=3300 ohms.
The resistances 271—272 and 271a—272a=270 ohms.
The resistances 259—262 and 265—268=120 ohms.
The resistances 260—263 and 266—269=1000 ohms.
The resistances of filter 227A=5000 ohms.
The resistances 294—296 and 308—310=220 ohms.
The resistances 301—302=1000 ohms.
The resistances connected to heater of 2X2 (Fig. 22= 2 ohms).
The resistances 323—324=1000 ohms.
The resistances 321=1000 ohms.
The resistances 329=1500 ohms.
The resistances in line 315=1000 ohms.
The resistances 318=220 ohms.
The condensers 289a—289b—289c and 289d=.001 mfd.
The condenser in filter 230=2 mfd.
The condenser in filter 227A=8 mfd.
The condensers 278—279 and 278a—279a=.05 mfd.
The condensers 295—297—307—309=4 mfd.
The condenser 319=4 mfd.
The condenser at the converter 225=.5 mfd.

While the embodiment of the present invention as herein disclosed, constitutes a preferred form, it is to be understood that other forms might be adopted, all coming within the scope of the claims which follow.

What is claimed is as follows:

1. In a control device for an aerial torpedo having elevators, the combination with a source of direct electrical current and a source of pulsating current; a servo-mechanism fed from the source of direct electrical current for actuating the elevators; an electromagnet relay; a photoelectric tube; a trigger tube in circuit with said photoelectric tube and the relay, said trigger tube being adapted to be energized by the photoelectric tube when excited to conduct the pulsating current to the relay to close it whereby the servo-mechanism is rendered active to actuate the elevators in one direction; and means in circuit with the relay for retarding its deenergization due to the pulsations of the current flowing therethrough.

2. In a control device for an aerial torpedo having elevators, the combination with a source of electrical power; a servo-mechanism for operating said elevators; a double, electromagnet relay; two photoelectric tubes; a source of pulsating electric current; two trigger tubes, each connected to the source of pulsating current and to an electromagnet, each trigger tube being adapted to be rendered conductive to the pulsating current from its source to its respective electromagnet relay in response to the excitation of the photoelectric tube connected therewith, whereby the servo-mechanism is rendered active to adjust the elevators in one direction or the other; and choking means connected to the double relay for eliminating vibratory operation of the relay due to its energization by a pulsating current.

3. In a control device as defined by claim 2, in which, however, the torpedo is also provided with rudders; a servo-mechanism for operating said rudders in either direction; a double electromagnet relay; a pair of photoelectric tubes; two trigger tubes each adapted to render a portion of the relay effective to cause operation of the servo-mechanism to move the rudders in response to excitation of the photo-electric tube connected to the respective trigger tube; and choke means provided on the double relay to prevent vibratory operation of said double relay.

4. In a control device for an aerial torpedo having elevators; servo-mechanism for operating said elevators in one direction or the other; a double electromagnet relay for controlling said servo-mechanism; a source of electric power adapted to be connected with the relay for actuating it; a pair of trigger tubes, each adapted to be rendered effective to connect the source of electric power to a relay whereby the servo-mechanism is rendered active to adjust the elevators in one direction or the other respectively; two photoelectric tubes; an amplifying tube for each photoelectric tube for controlling the impulses impressed by the excited photoelectric tube upon a respective trigger tube whereby said trigger tube is rendered effective; and means connected to both amplifying tubes, providing for degeneration of the one photoelectric tube when the excitation of the other photoelectric tube exceeds the excitation of said one photoelectric tube.

5. In a control device for an aerial torpedo having elevators and rudders, the combination with a source of electrical power; a servo-mechanism comprising a single electric motor and two pairs of normally disengaged clutches, each pair being adapted to be rendered effective to connect the motor with the elevators or the rudders respectively; a control device for each clutch; and individual means for rendering each control device effective to cause engagement of its respective clutch, said individual means comprising a photoelectric tube and a trigger tube in circuit therewith, said trigger tube being rendered effective to connect the power source with the control device for rendering it active in response to excitation of said photo-electric tube by light rays impinging thereon.

6. In a control device for an aerial torpedo having elevators and rudders, the combination with a source of electrical power; a servo-mechanism comprising a single electric motor and two pairs of normally disengaged clutches, each pair being adapted to be rendered effective to connect the motor with the elevators or rudders respectively; an electro-magnetic control device for each clutch; and mechanism for rendering each electromagnetic control device effective to cause engagement of the respective clutch controlled by it, said mechanism comprising a photoelectric tube and a trigger tube in circuit therewith and with the power source and electromagnetic control device, said trigger tube being rendered conductive to the current from the power source to the control device only when the photo-electric tube is excited by light rays impinging thereon.

7. In a control device for an aerial torpedo having elevators and rudders, the combination with a source of electrical power; a servo-mechanism comprising a single electric motor and two pairs of normally disengaged electromagnetic clutches, each pair being adapted to be individually energized and rendered effective operatively to connect the single electric motor with either the elevators or the rudder respectively; a unitary, two-way electromagnetic relay for controlling each pair of clutches; and separate control mechanism for energizing each relay to actuate it in one direction respectively to cause energization of the particular electromagnetic clutch controlled thereby, each of said mechanisms comprising a photoelectric cell and a trigger tube both in circuit with each other and with the source of power, the trigger tube being rendered effective to conduct current from the power source to an electromagnetic relay to render it active in response only to excitation of the photo-electric tube by light rays impinging thereon.

8. In a control device for an aerial torpedo having elevators and rudders, the combination with a source of electrical power; a servo-mechanism comprising a single electric motor adapted to be connected to said source of power and two pairs of normally disengaged electromagnetic clutches, each pair being adapted to be energized and rendered effective to connect the said motor with the elevators or rudders respectively; an electromagnetic relay for controlling each clutch; four photo-electric tubes; a source of pulsating current; and a trigger tube in circuit with each photo-electric tube, each trigger tube being connected to the source of the pulsating current and to an electromagnetic relay, each trigger tube being adapted to be rendered conductive to the pulsating current from its source to the respective electromagnetic relay in response to the excitation of the photo-electric tube in circuit therewith, whereby the single electric motor will be connected to the rudders or elevators by the energization of the electromagnetic clutch rendered effective by the action of the said energized relay.

9. In a control device for an aerial torpedo having rudders and elevators, the combination with a source of power; a servo-mechanism comprising a single electric motor adapted to be connected to said source of power and two pairs of individually acting electromagnetic clutches for connecting the said motor with the rudders or elevators respectively; a normally open electromagnetically actuated switch in circuit with each electromagnetic clutch; a source of pulsating current; a normally non-conducting trigger tube respectively connecting the source of pulsating current with each electromagnet switch; and a photo-electric tube in circuit with each trigger tube and adapted to render the trigger tube conductive to pass current from the pulsating current source to the connected electromagnetic switch when said photo-electric tube is excited by light rays impinging thereon, whereby an electromagnetic clutch is rendered effective to connect the single electric motor to either the rudders or the elevators to rotate them.

10. In a control device as defined by claim 9, in which, however, each photo-electric tube has an amplifying tube connected therewith for controlling the impulses impressed by the excited photo-electric tube upon a respective trigger tube; and means connected to each amplifying tube providing for degeneration of the one-photo-electric tube whose excitation is exceeded by the excitation of another photo-electric tube.

11. In a control device as defined in claim 8, in which, however, the torpedo is provided with means for preventing rotation of the torpedo about its longitudinal axis whereby proper functioning of the four photo-electric tubes and their cooperating control mechanism is maintained during the flight of the torpedo.

12. A device for directing an aerial torpedo launched toward an illuminated target, comprising a plurality of optical elements for focusing light rays emanating from said target, said elements being arranged in a particular pattern which has a definite directional relation to the target when the torpedo is launched; means rendered effective by inequalities of the light focused by said elements for correcting for any divergence of the torpedo from a substantially direct path toward the target, the proper functioning of said means requiring non-rotation of the torpedo about its longitudinal axis; and means comprising compass controlled, adjustable ailerons for preventing such rotation of the torpedo whereby the directional relation of the optical elements to the target, established at the time of launching, is substantially maintained during the entire flight of the torpedo.

ROBERT H. HILL.
JAMES H. GUYTON.

References Cited in the file of this patent

UNITED STATES PATENTS

| Number | Name | Date |
| --- | --- | --- |
| 1,222,630 | Husted | Apr. 17, 1917 |
| 1,388,932 | Centervall | Aug. 30, 1921 |
| 1,418,605 | Sperry | June 6, 1922 |
| 1,536,996 | Winter | May 5, 1925 |
| 1,540,121 | Hammond | June 2, 1925 |
| 1,871,469 | Rhea et al. | Aug. 16, 1932 |
| 1,873,579 | Haas | Aug. 23, 1932 |
| 1,958,258 | Alexanderson | May 8, 1934 |
| 2,100,934 | Berges | Nov. 30, 1937 |
| 2,165,800 | Koch | July 11, 1939 |
| 2,190,390 | Thiry | Feb. 13, 1940 |
| 2,289,242 | Chance | July 7, 1942 |
| 2,424,193 | Rost et al. | July 15, 1947 |

FOREIGN PATENTS

| Number | Country | Date |
| --- | --- | --- |
| 305,571 | Italy | Feb. 9, 1933 |
| 797,933 | France | Feb. 24, 1936 |
| 339,479 | Italy | Apr. 22, 1936 |